United States Patent [19]

Recasens et al.

[11] Patent Number: 5,149,510

[45] Date of Patent: * Sep. 22, 1992

[54] REACTIVE ZIRCONIUM OXIDE AND ITS PREPARATION

[75] Inventors: Joseph Recasens, Sorgues; Daniel Urffer, Morieres; Pierre Ferlanda, Le Poutet, all of France

[73] Assignee: Societe Europeen des Produits Refractaires, Paris, France

[ * ] Notice: The portion of the term of this patent subsequent to Mar. 26, 2008 has been disclaimed.

[21] Appl. No.: 528,484

[22] Filed: May 25, 1990

[30] Foreign Application Priority Data

Mar. 22, 1988 [FR] France ............... 88 03680

[51] Int. Cl.$^5$ .............................. C01G 25/00
[52] U.S. Cl. ...................... 423/84; 423/71; 423/85; 423/608
[58] Field of Search ............ 423/608, 71, 84, 85; 501/103

[56] References Cited

U.S. PATENT DOCUMENTS

| | | | |
|---|---|---|---|
| 1,755,512 | 4/1930 | Monk et al. | 423/608 |
| 4,622,311 | 11/1986 | Wakui et al. | 423/111 |
| 4,746,497 | 5/1988 | Jenkins et al. | 423/85 |
| 4,786,486 | 11/1988 | Gouelen et al. | 423/608 |
| 4,808,397 | 2/1989 | Albizzati et al. | 423/608 |
| 4,810,680 | 3/1989 | Bickford et al. | 423/608 |
| 4,885,266 | 12/1989 | Hughan et al. | 423/608 |
| 5,002,749 | 3/1991 | Recasens et al. | 423/608 |
| 5,011,673 | 4/1991 | Kriechbaum et al. | 423/608 |

*Primary Examiner*—Wayne Langel
*Assistant Examiner*—Steven Bos
*Attorney, Agent, or Firm*—Watson, Cole, Grindle & Watson

[57] ABSTRACT

A process for the preparation of improved zirconium oxides comprising A) providing a zirconium oxide which has been produced by thermal decomposition of zircon followed by chemical digestion of the resultant silicate phases, B) reacting the zirconium oxide at high temperature with an alkali metal hydroxide or carbonate so as to form an alkali metal zirconate, C) hydrolyzing the resultant alkali metal zirconate so as to produce a suspension of zirconium oxide hydrate in a concentrated solution of alkali metal hydroxide, D) separating the zirconium oxide hydrate from the concentrated solution and washing the zirconium oxide hydrate which has been isolated, and E) drying the zirconium oxide hydrate at a temperature in the range of from 110° to 570° C.

5 Claims, No Drawings

REACTIVE ZIRCONIUM OXIDE AND ITS PREPARATION

This application is a divisional application of application Ser. No. 324,685, filed Mar. 17, 1989, now U.S. Pat. No. 4,946,665.

The invention relates to a reactive zirconium oxide and its preparation.

Zirconium oxide (or zirconia) powder is employed particularly for the manufacture of complex inorganic compounds (piezoelectric ceramics) or of monolithic ceramics (so-called "technical" ceramics based on sintered stabilized zirconias).

In such applications there is a need for a "reactive" zirconium oxide, that is to say an oxide which tends to react as completely as possible in the cases where the zirconia must form compounds, at a given temperature and reaction time, but which exhibits a maximum consolidation, that is to say the easiest sintering for a minimum porosity, at as low a temperature and in as short a time as possible.

The reactivity of a pulverulent solid cannot be defined and measured unambiguously a priori. However, it is usually correlated with:

physical characteristics which can be measured using conventional laboratory techniques such as surface area, the size of the elementary coherence regions (volumes in which the structure is monocrystalline) and particle size distribution, analyzable chemical characteristics such as the nature and the quantity of impurities, physical characteristics which can be determined by simulation tests, such as dispersibility (aptitude to grinding and to dispersion).

In the case of zirconium oxide intended for the abovementioned applications what is required is:

a high surface area (more than 10 m$^2$/g), a coherence region size which is as small as possible (oxides with fine crystallites), an impurities content which is as low as possible, chiefly with regard to $SiO_2$, alkali metal oxides and anions (sulfates, chlorides, fluorides), a fine particle size (a median diameter of the order of 1 μm is desired), uniformly distributed (close to uniformity of particle size).

Unless a zirconium oxide combining fineness and uniformity is obtained directly by the process for the preparation of this oxide, the oxide obtained must have a high dispersibility so that a deagglomeration of the various aggregates and a reduction in the size of the individual particles can be ensured by a simple grinding operation.

Lastly, the zirconium oxide powder must be easily handlable and must therefore have a low volume swell and a low angle of rest, properties which are frequently difficult to reconcile with the other properties.

At the present time zirconium oxides of reactive grade are manufactured by precipitation from aqueous solutions obtained during the thermochemical decomposition of impure precursors rich in $ZrO_2$ (such as zirconium silicate sands). This results in anionic impurities, such as sulfates or chlorides, being fixed and having to be removed by calcination of the product at high temperature (approximately 950° C.). The need for this calcination step means that all the reactive zirconium oxides which are currently available have a set of common characteristics:

a surface area which in most cases varies between 5 and 15 m$^2$/g, without exceeding 25 m$^2$/g in the best cases;

the oxides are crystallized in the monoclinic form with coherence regions from 40 to 80 nm in size;

the particles consist of agglomerates of 1 to 10 μm made up of elementary particles of 0.05 to 0.5 μm.

This latter characteristic explains why it is frequently necessary to carry out an extended grinding of these oxides, by themselves or in the presence of grinding media, before use.

The present application is intended to provide zirconium oxides whose characteristics, which are usually correlated with reactivity, are improved.

More particularly, the invention provides reactive zirconium oxides consisting of finely divided particles whose median diameter does not exceed 10 μm, which have a structure chosen from the amorphous structure and the structure crystallized in the tetragonal form, the size of the elementary coherence regions in the latter case being between 10 and 30 nm, and which have a B.E.T. surface area of at least 30 m$^2$/g.

The zirconium oxides of the invention have an amorphous or partially crystallized structure. The predominant crystalline phase is the tetragonal phase (10–30 nm). A little monoclinic phase may be present in a proportion not exceeding 10%. However, this zirconia will always be called "tetragonal zirconia" within the scope of the invention.

They also have a B.E.T. surface area which is higher than 30 m$^2$/g and which can go up to 120 m$^2$/g and more. In most cases, the surface area will be within the range of 60 to 110 m$^2$/g.

The initial particle size of the zirconium oxides of the invention does not differ substantially from those of precipitated zirconium oxides, but their dispersibility is greatly superior.

The purity of the zirconium oxides of the invention is comparable to that of precipitated zirconium oxides insofar as the usual impurities of the oxide type, such as $SiO_2$ and $Na_2O$ are concerned, but their content of impurities of the anion type, such as $SO_4$ and Cl is lower. In certain cases the chief impurity is $H_2O$, whose content can be up to 12%. However, this can be greatly reduced, for example to 1% by weight or below, if the presence of water is ruled out in the case of the intended application, by employing a relatively high drying temperature, as will be seen later.

Finally, the zirconium oxides of the invention exhibit a volume swell comparable with that of the precipitated zirconium oxides of lower specific surface area, so that they remain easy to handle.

The invention also relates to a process for the preparation of the improved zirconium oxides defined above. This process comprises the steps consisting in:

a) reacting a relatively unreactive zirconium oxide at high temperature with an alkali metal hydroxide or carbonate so as to form an alkali metal zirconate, b) hydrolyzing the resultant alkali metal zirconate so as to produce a suspension of zirconium oxide hydrate in a concentrated solution of alkali metal hydroxide, separating the zirconium oxide hydrate from the said concentrated solution and washing the zirconium oxide hydrate isolated, and d) drying the zirconium oxide hydrate at a temperature in the range from 110 to 570° C.

Step a) may be performed by starting with a relatively unreactive and relatively pure zirconium oxide, for example a purified natural oxide (baddeleyite) or with a "thermal" zirconium oxide (obtained by thermal decomposition of zirconium silicate (zircon) in a furnace at high temperature (1880° C.), followed by chemical digestion of the silicate phase, as is known per se). Such relatively unreactive zirconium oxides are available commercially. They generally contain 0.06–0.7% by weight of $SiO_2$ as the main impurity, are in the form of a powder whose particles have a median diameter of 1.5–15 μm, and have a surface area of the order of 0.1–3 $m^2/g$. Any other zirconium oxide can also, of course, be employed as starting material, provided that it is sufficiently pure.

Sodium and potassium hydroxides or carbonates can be employed, in particular, as an alkali metal hydroxide or carbonate. Sodium hydroxide in the form of pellets or of concentrated solution is preferred. An excess of hydroxide or of carbonate, in relation to stoichiometry, is usually employed.

In the process which is employed, the reaction between the relatively unreactive zirconium oxide and the alkali metal hydroxide or carbonate takes place at high temperature, for example in the range from 600° to 950° C. The reaction time must be sufficient to ensure the conversion of the reactants into an alkali metal zirconate. This time will obviously vary as a function of the reaction temperature. By way of guidance, it may be from 30 min to 10 hours.

The hydrolysis step b) consists in bringing the product of, step a) into contact with an excess of water, preferably hot water, with stirring. The hydrolysis operation can take from 15 min to 1 hour, depending on the operating conditions (quantity of water employed, water temperature, stirring conditions).

The separation step c) can be performed in various ways (filtration, centrifuging, and the like), as will be obvious to those skilled in the art. The preferred operation is filtration. Subsequent washing can be carried out simply using water in order to remove the residual alkali metal hydroxide. A washing using a solution of an ammonium salt, such as $NH_4Cl$, can also be performed, to remove the residual sodium more rapidly.

Step d) greatly influences the quality of the final product. To avoid the presence of large quantities of residual water, drying should be carried out at a temperature of at least 110° C. However, exceeding a temperature of 570° C. should be avoided because, above this, the product forms the site of a crystallization in a monoclinic form, which lowers its surface area. The choice of the drying temperature affects the form of the zirconium oxide finally obtained. At drying temperatures ranging up to approximately 400° C., the zirconium oxide is obtained in an amorphous form. At higher drying temperatures it is partially crystallized in a tetragonal form. The water content of the zirconium oxide also decreases as the drying temperature rises in the range from 110° to approximately 450° C., then becoming stable. Conversely, the surface area tends of decrease when the drying temperature increases. If, therefore, a product with a very high surface area is desired, a relatively low drying temperature will be chosen, whereas if a product with a low water content is desired, a relatively high drying temperature will be chosen. A satisfactory compromise can nevertheless be obtained by employing a drying temperature within the range approximately from 350° to 450° C.

The duration of the drying step is of the order of a few hours (for example 5 to 10 hours) and will vary as a function of the temperature which is chosen.

After drying or before use, the zirconium oxide obtained may be subjected to a grinding operation in order to reduce the particle size, this operation being facilitated by virtue of the satisfactory dispersibility of the reactive zirconium oxide of the invention.

The process of the invention is highly economical, bearing in mind the wide availability of thermal zirconium oxides at a low price.

The following examples are given by way of illustrating the invention, no limitation being implied.

EXAMPLE 1

55 parts by weight of thermal zirconium oxide containing 0.4–0.5% of $SiO_2$ and having a mean particle size of approximately 4 μm, sold by the Société Européenne des Produits Réfractaires, are mixed with 45 parts by weight of NaOH in pellet form. The mixture is roasted at 850° C. for 1 hour in order to obtain a mixture of sodium zirconate and excess sodium hydroxide. The reaction mixture is placed in contact with 250 parts of water at 60° C. and the whole is stirred for approximately 1 hour. The resulting suspension is filtered on a filter under a pressure of between 1 and 4 bars, and the solid material retained on the filter is then washed with approximately 2000 parts of water. After this washing with water, the product is washed twice with an aqueous solution of ammonium chloride (100 g of $NH_4Cl$/liter), using 300 parts of solution each time. The product is finally dried for 8 hours at 420° C. in an oven. The characteristics of the zirconium oxide obtained are given in Table I, column A.

EXAMPLE 2

The operating procedure of Example 1 is repeated, except for starting with a thermal zirconium oxide containing 0.12% of $SiO_2$ and with a mean particle size of approximately 2.5 μm, sold by the Société Européenne des Produits Réfractaires, and that after the washing with water, the product is washed four times with 300 parts of the $NH_4Cl$ solution, each time, and then finally once with water (2000 parts).

The product is finally dried in an oven for 8 hours at 130° C. at a relative humidity of 50–75%. The characteristics of the zirconium oxide obtained are given in Table I, column B.

EXAMPLE 3

The operating procedure of Example 2 is repeated, except that a drying of 8 hours at 450° C. is carried out. The characteristics of the zirconium oxide obtained are given in Table I, column C.

The characteristics of six reactive zirconium oxides available commercially are also shown, for comparison, in Table I below (column D to I).

Table I clearly shows the superiority of the products of the invention with regard to the surface area and the content of $SO_4^{2-}$ anions.

TABLE 1

COMPARISON OF CHARACTERISTICS OF THE Zr OXIDES

| OXIDE | A | B | C | D | E | F | G | H | I |
|---|---|---|---|---|---|---|---|---|---|
| | according to the invention | | | according to the prior art | | | | | |
| Chemical analysis, % by weight | | | | | | | | | |
| $SiO_2$ | 0.40 | 0.09 | 0.09 | 0.35 | 0.17 | 0.23 | 0.10 | 0.10 | 0.01 |
| $Na_2O$ | 0.09 | 0.05 | 0.05 | 0.06 | 0.01 | 0.01 | 0.06 | 0.01 | 0.005 |
| $SO_4^{2-}$ | — | — | — | 0.15 | 0.14 | 0.25 | 0.15 | 0.16 | — |
| $Cl^-$ | 0.10 | 0.05 | 0.05 | 0.08 | 0.02 | 0.02 | — | — | 0.28 |
| $H_2O$ | 0.50 | 9.0 | 0.50 | 0.05 | 0.10 | 0.40 | 0.45 | 0.41 | 0.20 |
| Median particle diameter, μm | 4.3 | 1.0 | 1.1 | 4.7 | 5.6 | 1.7 | 1.1 | 0.5 | 1.0 |
| BET surface area (m²/g) | 95 | 130 | 60 | 6.0 | 6.5 | 9.6 | 22 | 21 | 5.6 |
| Crystalline phase | * | ** | * | *** | *** | *** | *** | *** | 90%*** + 10%* |
| Elementary region size, nm | 20 | | 25 | 60 | 70 | 60 | 43 | 47 | 35 |

*tetragonal - amorphous - *monoclinic

D: Zirconia from the Société Européenne des Produits Réfractaires obtained according to the usual process of precipitation of basic sulfate and displacement.
E, F: Zirconias E 20 and E 16, respectively, from Magnesium Elektron Ltd.
G: Zirconia DK1 from Daichi Kigenso DK
H: Zirconia EG from Harshaw
I: Zirconia UHP, from Criceram

EXAMPLE 4

The operating procedure of Example 2 was repeated, except that the drying temperature was varied. Table II below summarizes the properties (water content, specific surface area, form) of the zirconium oxides obtained.

TABLE II

CHANGE IN THE CHARACTERISTICS OF ZIRCONIUM OXIDE ACCORDING TO DRYING TEMPERATURE

| Drying temperature (°C.) | Water content (weight %) | BET surface area m²/g | Phases present |
|---|---|---|---|
| 130 (Example 2) | 9 | 130 | Amorphous |
| 300 | 5 | 110 | Amorphous |
| 400 | 1 | 100 | Amorphous |
| 450 | 0.5 | 60 | Tetragonal + amorphous |
| 500 | 0.5 | 30 | Tetragonal + amorphous |
| 600* | 0.5 | 10 | 75% tetragonal + 25% monoclinic in the crystalline phase + traces of amorphous phase |

*Outside the scope of the invention.

It can be seen that the best compromise with regard to the water content and to the specific surface area is obtained at drying temperatures from 400° to 450° C.

EXAMPLE 5

The volume swell of zirconium oxides A and C of Examples 1 to 3 has been measured in comparison with those of commercial oxides E, F and I of Table I. The volume swell has been measured with the aid of a powder analysis unit of the Hosokawa type, sold by Hosokama Europe Limited, Buckinghamshire (Great Britain).

The results obtained are summarized in Table III below.

TABLE III

VOLUME SWELL OF Zr OXIDES

| Oxide | According to the invention | | Prior art | | |
|---|---|---|---|---|---|
| | A | C | E | F | I |
| Porosity (%) of unpacked powder | 88 | 93 | 75 | 87 | 88 |

TABLE III-continued

VOLUME SWELL OF Zr OXIDES

| Oxide | According to the invention | | Prior art | | |
|---|---|---|---|---|---|
| | A | C | E | F | I |
| of packed powder | 78 | 82 | 66 | 80 | 80 |
| BET surface area (m²/g) | 95 | 60 | 6.5 | 9.6 | 5.6 |

EXAMPLE 6

The dispersibility of zirconium oxide A of Example 1 was measured in comparison with that of a zirconium oxide produced according to the prior art (Example D).

The test consisted in comparing the dispersibility of Zr oxides by grinding them by a wet route in a continuous microdisperser under uniform conditions. The change in the particle size distribution curve was measured.

The microdisperser was a KD Pilot apparatus (manufactured by the W. A. Bachofen company) (speed 10 m/s, grinding charge consisting of electrofused ceramic beads 0.8–1.25 mm in size).

The aqueous suspension of $ZrO_2$ had a weight concentration of 30% and its rate of flow through the mill was 30 l/h (that is approximately 12 kg/h of solids).

The particle size distribution was evaluated before and after the run in the apparatus, using sedimentation (Coultronics Sedigraph 5000).

| Particle size distribution* | Zirconia Example A according to the invention | | Zirconia of the prior art | |
|---|---|---|---|---|
| | Before | After | Before | After |
| $\phi_{50}$ (μm) | 4.30 | 0.9 | 4.70 | 1.2 |
| $\phi_{90}$ (μm) | 13.0 | 2.95 | 12.5 | 5.8 |
| $\phi_{10}$ (μm) | 0.59 | 0.27 | 0.62 | 36.0 |
| % <1 μm | 21.5 | 55.0 | 17.5 | 36.0 |
| % <2 μm | 31.5 | 84.0 | 26.0 | 52.5 |
| % <4 μm | 47.5 | 97.0 | 44.0 | 80.0 |
| % <8 μm | 74.0 | 98.0 | 73.5 | 95.5 |

*$\phi_x$ is the diameter corresponding to x % of the material passed.

Despite a closely related initial particle size distribution, the two oxides are clearly distinguishable after grinding. Oxide A has a particle size distribution which is substantially finer and clearly more monodisperse.

The "slope" of the curve ($\phi_{90}-\phi_{10}$) is 2.08 μm in the case of oxide A and 5.49 μm in the case of the oxide according to the prior art.

We claim:

1. A process which comprises:
   a) providing a zirconium oxide produced by thermal decomposition of zircon followed by chemical digestion of a resultant silicate phase,
   b) reacting said zirconium oxide at 600°–950° C. with an alkali metal hydroxide or carbonate so as to form an alkali metal zirconate,
   c) hydrolyzing the resultant alkali metal zirconate so as to produce a suspension of zirconium oxide hydrate in a concentrated solution of alkali metal hydroxide,
   d) separating the zirconiium oxide hydrate from said concentrated solution and washing the zirconium oxide hydrate isolated, and
   e) drying the zirconium oxide hydrate at a temperature in the range of 110° to 570° C. whereby a zirconium oxide compound is recovered.

2. The process as claimed in claim 1, wherein sodium hydroxide is employed as an alkali metal hydroxide.

3. The process as claimed in claim 1, wherein the washing step comprises at least one washing with water followed by at least one washing with an ammonium chloride solution.

4. The process as claimed in claim 1, wherein the drying step is performed at a temperature within the range approximately from 350° to 450° C.

5. The process as claimed in claim 1, which additionally comprises a final grinding step.